United States Patent [19]
Collins et al.

[11] Patent Number: 5,244,530
[45] Date of Patent: Sep. 14, 1993

[54] APPARATUS AND METHOD FOR LAMINATING PATCHES OF A FIRST WEB MATERIAL ONTO A SECOND WEB MATERIAL

[75] Inventors: Alfred L. Collins, Powhatan; Billy J. Keen, Jr., Chesterfield; George B. Reid; Renzer R. Ritt, Sr., both of Richmond; William H. Stevens, Midlothian; Howard W. Vogt, Jr., Providence Forge, all of Va.

[73] Assignee: Philip Morris Incorporated, New York, N.Y.

[21] Appl. No.: 992,157

[22] Filed: Dec. 17, 1992

Related U.S. Application Data

[62] Division of Ser. No. 837,722, Feb. 18, 1992, Pat. No. 5,200,020.

[51] Int. Cl.[5] ............................................. B32B 31/00
[52] U.S. Cl. ........................................ 156/519; 156/521; 156/552; 156/566; 156/571; 198/408
[58] Field of Search ............... 156/359, 355, 357, 361, 156/571, 552, 566, 516, 517, 519, 521, 522; 198/408

[56] References Cited

U.S. PATENT DOCUMENTS

| | | | |
|---|---|---|---|
| 2,941,655 | 6/1960 | Wells | 198/408 |
| 3,474,752 | 3/1968 | Shirozu | 198/408 X |
| 3,565,724 | 2/1971 | Yamaguchi | 156/354 |
| 3,963,557 | 6/1976 | Patterson | 156/568 X |
| 4,767,487 | 8/1988 | Tomsovic | 156/552 X |

*Primary Examiner*—David A. Simmons
*Assistant Examiner*—Charles E. Rainwater
*Attorney, Agent, or Firm*—Jeffrey H. Ingerman; John M. Hintz

[57] ABSTRACT

Apparatus and a method for laminating patches to a base web accurately, and as efficiently as possible, are provided. Two webs are fed at speeds which are related as the ratio of the width of each patch to the separation distance between patches, the patch web moving more slowly. Patches are cut from the patch web and transferred to the other web while being accelerated to the higher speed.

6 Claims, 3 Drawing Sheets

APPARATUS AND METHOD FOR LAMINATING PATCHES OF A FIRST WEB MATERIAL ONTO A SECOND WEB MATERIAL

This is a division of application Ser. No. 07/837,722, filed Feb. 18, 1992 entitled "Apparatus and Method for Laminating Patches of a First Web Material Onto a Second Web Material" now U.S. Pat. No. 5,200,020.

BACKGROUND OF THE INVENTION

This invention relates to apparatus and a method for laminating patches of a first web material onto a larger web of a second web material. More particularly, this invention relates to apparatus and a method for laminating patches of web material onto cigarette paper prior to the incorporation of the cigarette paper into cigarettes.

Cigarette papers have known burning characteristics, including burn rates and static burn capabilities. It is known that such characteristics can be modified by adding fillers and burn control additives to the papers. It is also known that such characteristics can be modified in selected portions of a cigarette paper web by applying to the web a strip or patch of a paper having different characteristics than the web to be modified.

For example, it is shown in copending, commonly-assigned U.S. patent application Ser. No. 07/605,402, filed Oct. 30, 1990, which is hereby incorporated by reference in its entirety, that cigarette wrapper paper can be modified in periodically spaced areas by applying bands of a different paper at periodically spaced positions across the width of the wrapper paper, so that cigarettes produced from the wrapper paper have periodically spaced circumferential bands on the inside of the wrapper for modifying the burning characteristics of the wrapper and the cigarette. One treated paper material suitable for forming the periodically spaced bands is described in U.S. Pat. No. 4,739,775, which is hereby incorporated by reference in its entirety.

The application of bands to a base cigarette paper web can be accomplished "on-line" on a cigarette making machine, by adding one or more stations to the machine between the cigarette paper unwinding station and the garniture of the machine. However, the cigarette paper is moving at very high speed (e.g., up to about 700 m/min) at that point and it may be difficult to control the proper placement of the bands. For example, it may be difficult to line the bands up as nearly perpendicular to the paper edge as desired, or to line up the bands with the paper edge without overlap. It may also be difficult to assure that the bands are firmly adhered and set by the time they reach the garniture, so that they do not move during cigarette formation. To the extent that these difficulties may arise, it may be advantageous to laminate the bands to the cigarette paper in an "off-line" process where it may be possible to better control the placement and adhering of the bands. It would also be advantageous to be able to laminate the bands to the cigarette paper with better control even on-line on a cigarette maker.

It would be desirable to be able to provide apparatus and a method for laminating patches to a base web accurately, and as efficiently as possible.

SUMMARY OF THE INVENTION

It is an object of this invention to provide apparatus and a method for laminating patches to a base web accurately, and as efficiently as possible.

In accordance with this invention, there is provided apparatus for laminating patches of a first web material, each of said patches having a patch length and a patch width, onto spaced-apart patch locations on a strip of a second web material. The strip has a strip width substantially equal to the patch length. The spaced-apart patch locations are located at regular integral multiples of the patch width. The apparatus comprises advancing means for advancing the second web material along a first travel direction to a lamination position, feeding means adjacent the second web material at the lamination position for feeding a band of the first web material, the band having a band width substantially equal to the patch length, patch cutting means for cutting patches from the band of the first web material, and placement means for adhering the first web material to the second web material at the spaced-apart patch locations.

A lamination method is also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

In accordance with this invention, a reel of cigarette paper is unwound and run past a lamination station. At the lamination station, a row of patches of the desired paper or other web material are applied. The base web runs continuously as the bands are applied to an area of the base web. The reel of cigarette paper can be rewound beyond the lamination station, or run directly into a cigarette making machine.

Although the invention is described below in connection with the application of one row of patches to a single-width strip of cigarette paper, the cigarette paper could be of a multiple width, and a number of rows of patches can be applied at the lamination station, or a single row of multiple width patches can be applied, by changing either the number or the width of the patch applying apparatus. If a multiple width laminated strip is produced, it can be rewound and then cut into single width reels for later use on cigarette making machines, or it can be slit on-line and fed directly into multiple cigarette making machines.

Figure 1:
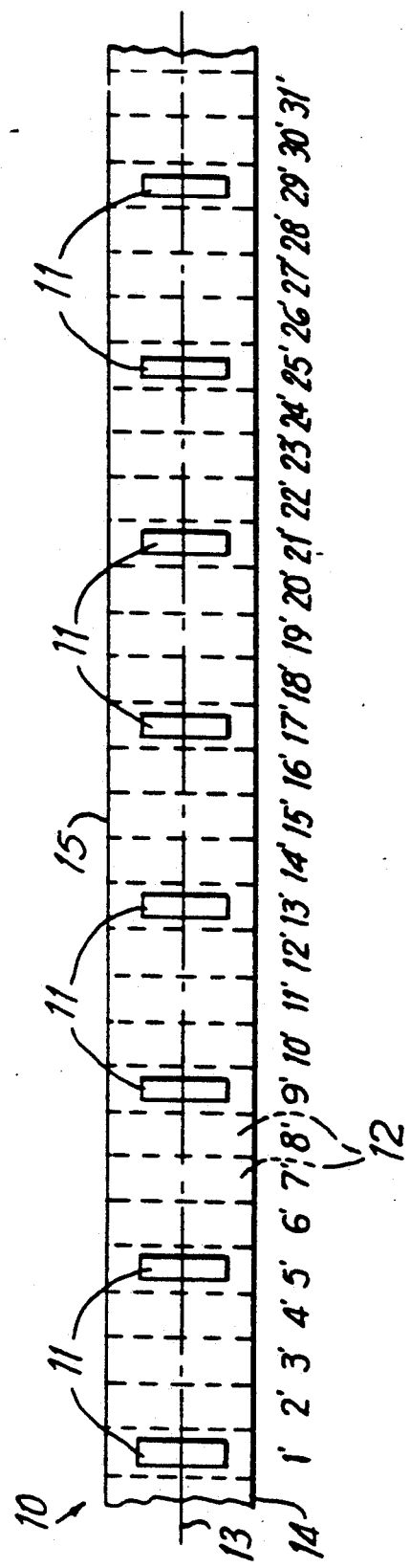
FIG. 1 is a plan view of a cigarette paper web having patches applied thereto in accordance with the present invention.

The finished product which is the goal of the present invention is shown in FIG. 1. A laminated single-width strip 10 of cigarette paper base web 26 has had a plurality of parallel patches 11 applied to it. In the embodiment shown, patches 11 are separated by three patch widths; every fourth patch width space 12 (shown in phantom) is occupied by a patch 11.

When cigarette paper 10 is formed into cigarettes, it is rolled about longitudinal axis 13 so that edges 14, 15 overlap. Edges 14, 15 are then glued together to form a cigarette tube, or rod, containing tobacco. To assure a good seal when edges 14, 15 are glued, patches 11 are preferably shorter than the width of strip 10, so that the ends of patches 11 do not interfere with the overlap of edges 14, 15. However, it is possible to use patches (not shown) that extend from edge 14 to edge 15. As stated above, strip 10 could be run directly into a cigarette making machine after patches 11 are applied, or it could be rewound for later use.

Figure 2:
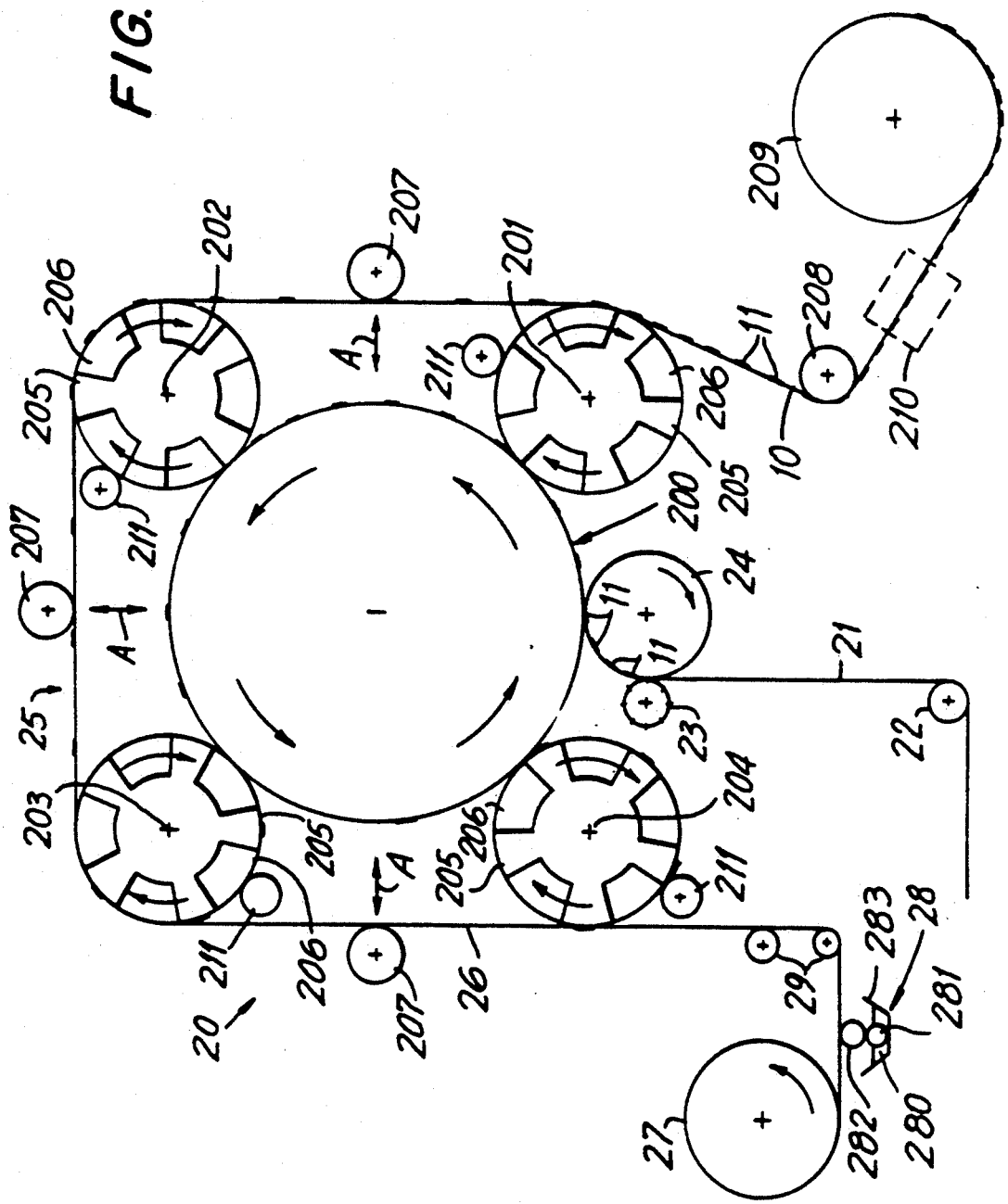
FIG. 2 is a schematic elevational view of a first embodiment of apparatus according to the present invention.

A first embodiment of apparatus 20 according to the present invention for applying patches 11 to strip or web 10 is shown schematically in FIG. 2. A web of patch material 21 of the desired width is fed from a supply reel or bobbin (not shown) at a patch supply speed over roller 22 to rotary knife 23 which acts against cutting drum 24. Cutting drum 24 rotates at a surface speed equal to or slightly faster than the patch supply speed, so that knife 23 forms abutting or slightly spaced apart patches 11 on the surface of drum 24. Patches 11 are retained on the surface of drum 24 by a conventional vacuum arrangement which is released as each patch 11 passes to lamination station 25.

At the same time, cigarette paper base web 26 is fed at a second, faster web supply speed from reel or bobbin 27. The ratio of the web supply speed to the patch supply speed is substantially equal to the inclusive patch separation distance on finished laminated web 10, expressed in patch widths; in the preferred embodiment, to produce web 10 as shown in FIG. 1, the ratio is 4:1.

Cigarette paper base web 26 first passes glue-applying station 28 where roller 281, rolling in a bath 283 of glue 280, transfers glue 280 to glue-applying roller 282, which is not shown to scale. The surface of roller 282 has a series of lands and depressions (not shown) arranged so that glue is transferred only to the lands from roller 281, subsequently being transferred by the lands to areas on cigarette paper base web 26 which are separated by distances identical to those separating the lands. Roller 281 is timed with lamination station 25 to assure that patches 11 are applied to the areas to which glue has been applied, as is well-known to those skilled in the art. Cigarette paper base web 26, with glue patches applied, passes over rollers 29 to lamination station 25.

Lamination station 25 has a large primary transfer drum 200, and smaller secondary transfer drums 201, 202, 203 and 204. Although here the number of secondary transfer drums is four, any other number (greater than one) may be provided, as discussed in more detail below. Each of drums 200-204 has conventional vacuum retention capability, just as does cutting drum 24. Each of drums 200-204 rotates with a surface speed substantially equal to the web supply speed.

Thus where patches 11 are transferred from cutting drum 24 to primary transfer drum 200, they are accelerated to the web supply speed, and assume positions on the surface of drum 200 spaced apart by their final desired spacing on web 10. Each secondary transfer drum transfer its pro rata share of patches 11 from primary transfer drum 200 to web 26; here, with four secondary transfer drums 201-204, each secondary transfer drum transfers one quarter of patches 11. Referring to the numbered positions along web 10 in FIG. 1, secondary transfer drum 204 will apply patches 11 to spaces 1', 17', etc., secondary transfer drum 203 will apply patches 11 to spaces 5', 21', etc., secondary transfer drum 202 will apply patches 11 to spaces 9', 25', etc., and secondary transfer drum 201 will apply patches 11 to spaces 13', 29', etc.

Each secondary transfer drum 201-204 has series of lands 205 and depressions 206. Each land 205 has vacuum retention capability and is the surface of secondary transfer drum 201-204 which performs the actual transfer of patches 11. Depressions 206 are provided so that a particular secondary transfer drum 201-204 does not pick up patches 11 from primary transfer drum 200 that are meant for another one of drums 201-204, and does not roll over adhesive areas of web 26 to which patches 11 have not yet been applied and to which other ones of drums 201-204 will be applying patches 11. The arc length subtended by one land 205 and an adjacent depression 206 equals the inclusive spacing between adjacent patches 11 on web 10 applied by the same one of drums 201-204; here that arc length is sixteen patch widths. The arc length subtended by land 205 is at least equal to one patch width, and is at most equal to the inclusive spacing between adjacent patches 11 on web 10, which here is four patch widths, so that a particular land 205 does not pick up any patches 11 from primary transfer drum 200 other than those patches 11 intended for it, and does not roll over any as yet unused adhesive areas of web 26.

Rollers 207 are provided between each pair of adjacent secondary transfer drums 201-204. Rollers 207 can move back and forth in the directions of arrows A, and are used for fine adjustment of the path length between adjacent drums 201-204 to maintain the proper spacing of patches 11 on web 10.

After laminated web 10 passes out of lamination station 25, it passes over roller 208 and is rewound on reel or bobbin 209, although it could pass directly into a cigarette making machine. If necessary, drying station 210, using hot air, microwaves, or any other appropriate form of heating, could be provided to set glue 280 before web 10 is rewound.

While apparatus 10 is shown with four secondary transfer drums 201-204, it is possible to use any number of secondary transfer drums, increasing or decreasing the arc length subtended by depressions 206 as the number of secondary transfer drums increases or decreases, and possibly adjusting the radii of the secondary transfer drums accordingly. The only limitations are that there must be at least two secondary transfer drums, and all of the secondary transfer drums, with their potentially larger radii, must fit around primary transfer drum 200.

In addition, it is possible to provide secondary transfer drum 201 without depressions 206. By the time web 26 reaches drum 201, all patches 11 have been applied, and a solid drum surface might be helpful in pressing patches 11 into place.

It is also possible to eliminate glue-applying station 28, and instead to have heat- or water-activatable adhesive on the surface of web 21 of patch material. In the case of heat-activatable adhesive, secondary transfer draw 201, 202, 203, 204 could be heated to activate the adhesive. In the case of water-activatable adhesive, an appropriate water-applying roller 211 could be provided adjacent each secondary transfer drum 201, 202, 203, 204 to wet and activate the adhesive.

Figure 3:
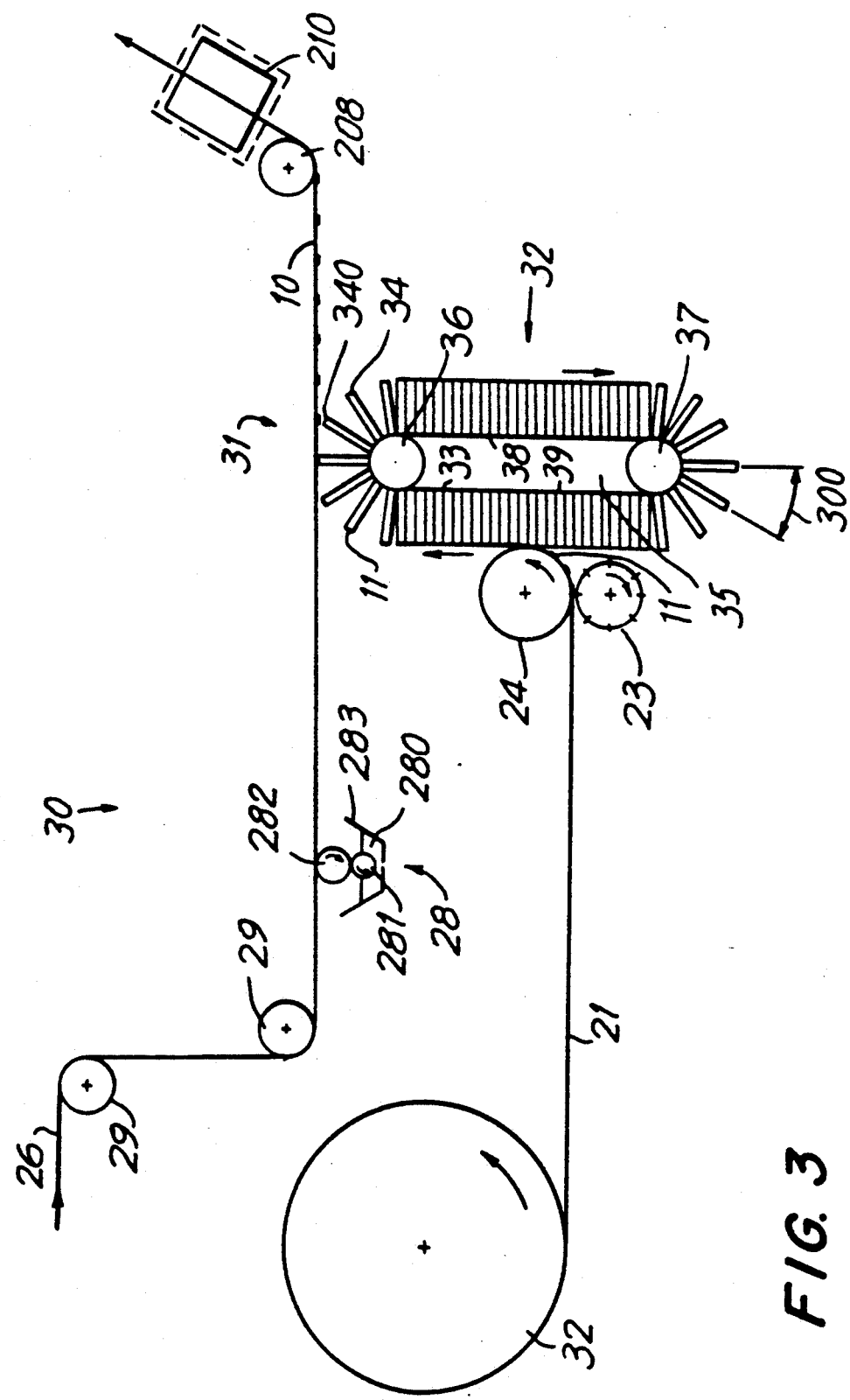
FIG. 3 is a schematic elevational view of a second embodiment of apparatus according to the present invention.

A second embodiment of apparatus 30 according to the present invention is illustrated in FIG. 3. Here, web 26 is supplied at a web supply speed from a supply (not shown) over rollers 29, through glue-applying station 28, and on to lamination station 31. At the same time, web 21 is supplied at a patch supply speed from a reel or bobbin 31 to rotary knife 23 acting against cutting drum 24 to cut patches 11 which are transferred from drum 24 to lamination station 31. The relationship of the web supply speed to the patch supply speed is the same as in the first embodiment, above; here, the ratio of web supply speed to patch supply speed is 4:1.

In apparatus 30, the acceleration of patches 11 is accomplished by transfer element 32, which includes a belt 33 carrying a plurality of transfer links 34 around a vacuum plenum 35 on two hubs 36, 37 which here are of equal radius but need not be. Transfer links 34 are elongated and project from belt 33 to the surfaces of cutting drum 24 and web 26. Each transfer link 34 has the same width as a patch 11, and when transfer links 34 are on straight traces 38, 39 of belt 33, they abut one another.

Traces 38, 39 move at the patch supply speed, each link 34 picking up, by vacuum, one of patches 11 from the surface of cutting drum 24. As link 34 rounds hub 36, it maintains the same angular velocity, but the linear velocity of its tip 340, carrying patch 11, increases, as does the spacing between adjacent tips 340. By choosing the length of links 34 and the radius of hub 36 properly, as discussed below, the linear speed of tip 340 adjacent web 26 can be matched to the web supply speed, while the spacing between adjacent tips 340 adjacent web 26 can be matched to the desired inclusive patch separation distance which here is four patch widths.

As tip 340 passes web 26, vacuum is released and patch 11 is transferred to web 26. Afterwards, laminated web 10 passes over roller 208 and through optional heater 210, and from there it passes either to a rewinding reel or bobbin (not shown) or directly to a cigarette making machine.

The linear surface speed of hub 36 is the same as that of traces 38, 39, which is the patch supply speed. In order for the linear speed of tip 340 to match the web supply speed as link 34 rounds hub 36, the total radius from the center of hub 36 to tip 340 must equal the ratio of the two speeds. Thus, the ratio of (a) the sum of (1) the length of link 34 and (2) the radius of hub 36 to (b) the radius of hub 36 must equal the ratio of the two speeds. Here, where the speed ratio is 4:1, the length of link 34 must be three times the radius of hub 36 $((3+1)/1=4)$.

It is also necessary for the tip separation adjacent web 26 to equal the desired patch separation distance. To achieve that result, the product of the total tip radius and the angle, expressed in radians, between adjacent links 34 adjacent web 26 should equal the desired patch separation distance. The angle in question is shown at 300 in connection with hub 37 for convenience, because both hubs 36, 37 have the same radius in the preferred embodiment. However, it should be noted that that need not be true in the general case, and it is the angle adjacent hub 36 that is significant.

Angle 300 is equal to $\pi$ radians divided by the number of links 34 that fit around half the circumference of hub 36. The number of links 34 that fit around half the circumference of hub 36 is equal to half the circumference of hub 36 divided by the patch width. Thus the angle, in radians, is:

$$\frac{\pi}{\pi r/p} = \frac{p}{r} \tag{1}$$

where r is the hub radius and p is the patch width.

The tip separation distance is thus:

$$(L+r)p/r \tag{2}$$

and the desired condition is therefore:

$$(L+r)p/r = np \tag{3}$$

where L is the link length and n is the ratio of patch separation to patch width; here, n=4. Expression (3) simplifies to:

$$(L+r)/r = n \tag{4}$$

which is the same result reached in setting the tip speed equal to the web supply speed.

Thus it is seen that apparatus and a method for laminating patches to a base web accurately, and as efficiently as possible, have been provided. One skilled in the art will appreciate that the present invention can be practiced by other than the described embodiments, which are presented for purposes of illustration and not of limitation, and the present invention is limited only by the claims which follow.

What is claimed is:

1. Apparatus for laminating patches of a first web material, each of said patches having a patch length and a patch width, onto spaced-apart patch locations on a strip of a second web material, said strip having a strip width substantially equal to said patch length, said spaced-apart patch locations being located at regular integral multiples of said patch width, said apparatus comprising:
   (a) advancing means for advancing said second web material at a first linear velocity along a first travel direction to a lamination position;
   (b) feeding means adjacent said second web material at said lamination position for feeding a band of said first web material at a second linear velocity, said band having a band width substantially equal to said patch length;
   (c) patch cutting means for cutting patches from said band of said first web material, said patch cutting means operating at a surface velocity substantially equal to said second linear velocity, said first linear velocity being a multiple of said second linear velocity;
   (d) applicator means for applying to a surface of said first web material facing said second web material, or a surface of said second web material facing a surface of said first web material, or both, a pattern of adhesive at spaced-apart adhesive locations corresponding to said spaced-apart patch locations;
   (e) acceleration means for spacing apart said continually cut patches and transferring each of said spaced-apart patches to said spaced-apart patch locations on said second web wherein
      (1) a pair of hubs, one of said hubs being adjacent said strip of said second web material, said one of said hubs having a radius and a circumference;
      (2) a belt running over said hubs at said second linear velocity; and (3) a plurality of transfer links carried by said belt, each of said transfer links having a width substantially equal to said patch width, and having a length from said belt to a distal end, said belt being spaced from said cutting drum and from said strip by said length, whereby said distal end of each of said transfer links picks up one of said patches from said patch cutting means as said link passes said patch cutting means and accelerates and deposits said one of said patches on said strip as said link rounds said hub; and (f) activation means for activating said activatable adhesive.

2. The apparatus of claim 1 wherein said cutting means comprises a rotary knife and a cutting drum against which said rotary knife acts.

3. The apparatus of claim 2 wherein said rotary knife substantially continually cuts patches from said band.

4. The apparatus of claim 1 wherein said adhesive is water-activatable and said activations means comprises means for wetting said surface of said first web material or said surface of said second web material or both.

5. The apparatus of claim 1 wherein said adhesive is heat-activatable and said activations means comprises means for heating said first web material or said second web material or both.

6. The apparatus of claim 1 wherein:

the ratio of the sum of said link length and said hub radius to said hub radius is substantially equal to said multiple; and the product of (1) the sum of said link length and said hub radius and (2) the angle bearing the same ratio to a complete circle as said patch width bears to said hub circumference is substantially equal to the product of said patch width and said multiple.

* * * * *